April 13, 1954  H. ZENFTMAN  2,675,339
BONDING OF POLYETHYLENE WITH RESINOUS POLYMERIC
AROMATIC PHOSPHORIC ESTER ADHESIVES
Filed June 30, 1950
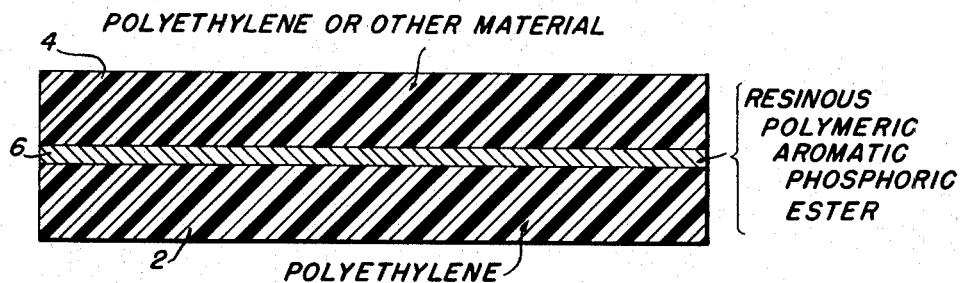
INVENTOR
Henryk Zenftman
BY Cushman, Darby & Cushman
ATTORNEYS Patented Apr. 13, 1954

2,675,339

UNITED STATES PATENT OFFICE 2,675,339

BONDING OF POLYETHYLENE WITH RESINOUS POLYMERIC AROMATIC PHOSPHORIC ESTER ADHESIVES

Henryk Zenftman, Saltcoats, Scotland, assignor to Imperial Chemical Industries Limited, a corporation of Great Britain Application June 30, 1950, Serial No. 171,541

Claims priority, application Great Britain August 23, 1949

15 Claims. (Cl. 154—139)

The present invention relates to a method for the production of composite articles, structures and the like wherein the surface of a material of polyethylene character is united to a surface of another material that is not of polyethylene character, and to the resulting articles, structures and the like.

It is known that one of the characteristic properties of polyethylenes is their unusually low capacity for adherence to other materials. This property has hitherto made it practically impossible to obtain a lasting coating of film-forming materials other than polyethylene on articles made of polyethylene, or to effect a satisfactory bonding between the surface of an article made of a material other than polyethylene, for instance, glass, wood, metal, rubber, regenerated cellulose, synthetic resin, cellulose derivative plastics, paper, or textile materials made of natural cellulose or cellulose derivative fibres or of natural or artifical protein fibres, and a coating of polyethylene or of a composition consisting mainly of polyethylene. This difficulty applies whether one or other of the elements of the desired composite article or structure is to be built up as a coating by deposition from solution or from a molten condition or where both elements are preformed and it is required to bond them together.

Although polyethylene is fusible and articles made of other materials are sometimes coated by applying polyethylene to them in a more or less molten condition, for instance by spraying, the solidified polyethylene coating is liable to become detached very easily, and only in the case where both of the elements whose surfaces to be united are themselves of polyethylene character is it possible to get a satisfactory bond by welding them together. No satisfactory adhesive for polyethylene has hitherto been discovered.

We have now discovered that excellent adhesives for polyethylene are provided by artificial resinous polymeric aromatic phosphoric esters of the kind characterised by containing a recurrent grouping wherein a pentavalent phosphorus atom is bound to a terminal oxygen atom, to a terminal oxyaryl group, and to each of two similar phosphorus atoms through an oxygen atom of the radicle of an aromatic compound having two nuclear hydroxyl groups attached to non-adjacent carbon atoms.

In the dihydroxy compound corresponding to the aforesaid radicle there may be one or more aromatic nuclei in the molecule, which may or may not share nuclear carbon atoms in common. In the case where there is more than one nucleus the hydroxy groups may advantageously be present in different nuclei; e. g. they may be in the para- or meta-position to one another in a monocyclic-dihydroxy aromatic compound or in the 4:4′-position in the case of a dihydroxy-diphenyl derivative. Dihydroxy-naphthalene compounds are also admissible. The terminal oxyaryl group may if desired comprise more than one aromatic nucleus. The presence of halogen or alkyl substituent groups in either the terminal-oxyaryl or the aromatic radicle linking the phosphorus atoms is often desirable.

The aforesaid artificial resinous polymeric aromatic phosphoric esters, which of their nature have insignificant acid numbers, may advantageously be prepared according to the methods described in British application No. 117/48, which corresponds to U. S. application Ser. No. 56,907, now issued as U. S. Patent No. 2,636,876 of April 28, 1953, or British application No. 14,444/49, which has been filed in the United States as U. S. Ser. No. 151,298.

As described in these British cases, a process for the production of the artificial resinous materials comprises condensing an aryloxy-phosphoryl dichloride and a dihydroxy-aromatic compound both hydroxyl groups of which are attached to non-adjacent carbon atoms.

Preferably the aryloxy-phosphoryl dichloride and the dihydroxy-aromatic compound are in equimolecular proportions.

The said condensation is preferably effected by heating a mixture of the said compounds until the required resinous properties have been developed in the reaction mixture. Preferably the reaction is effected by heating for several hours at temperatures rising progressively as the reaction proceeds from say 100° C.–180° C. at the start to say 190° C.–240° C. It is desirable slowly to stir the reaction mixture particularly as its viscosity begins to increase. It is to be understood that moisture must be excluded during the reaction. It is preferable to carry out the reaction in an inert atmosphere as for example nitrogen or carbon dioxide. The reaction is also preferably carried out at normal pressures but it is preferable to apply suction after completion of the reaction to remove traces of hydrogen chloride from the viscous product. The presence of hydrogen chloride elimination catalysts as for example metallic tin, calcium chloride, boron trifluoride and zinc or aluminum chloride, the latter two in very small proportions, is sometimes desirable to assist the progress of the reaction.

The said condensation may also be effected by treating the aryloxy-phosphoryl dichloride with the dihydroxy-aromatic compound, in a common solvent and including in said solvent a hydrogen chloride "acceptor."

As examples of a common solvent may be mentioned: ether, benzene, chloroform. The "acceptor" may be for example a tertiary amine as for example pyridine.

As is stated in these specifications, these resinous polymeric aromatic phosphoric esters are fusible materials soluble in a variety of volatile organic solvents and insoluble in water, and can be used as cements for bonding purposes to a variety of other materials and in particular exhibit excellent adhesion to glass and metals.

The employment of the aforesaid resinous polymeric aromatic phosphoric esters thus affords the possibility whereby an article made of polyethylene may have applied to it by deposition or fusion for decorative or other purposes an adherent coating in which the film forming ingredient consists wholly or in part of the aforesaid resinous polymeric aromatic phosphoric ester, or may have applied to it a composite coating comprising an over-coating of some other film-forming material over an intermediate coating comprising the aforesaid resinous polymeric aromatic phosphoric ester. The adhesion capacity of these resinous polymeric aromatic phosphoric esters for polyethylene surfaces moreover enables a composite article to be formed by bonding a surface of polyethylene to the surface of an article or layer of substantial thickness of some other material for which the resinous polymeric aromatic phosphoric ester has a capacity for adherence, by using the aforesaid resinous polymeric aromatic phosphoric ester as a cement. It also becomes possible to provide an article made of a material for which the aforesaid resinous polymeric aromatic phosphoric esters have a capacity for adhesion with an outer surface coating or layer of polyethylene.

In the accompanying drawing there is shown an embodiment of this invention which comprises a laminated structure containing three layers. As indicated, the structure includes a polyethylene base 2 bonded to another layer of polyethylene or other material 4 through an adhesive layer 6 of a resinous polymeric aromatic phosphoric ester as disclosed above. As will be appreciated, the structure illustrated in the drawing only exemplifies the invention and should not be considered as limiting since other structural modifications will become apparent to one skilled in the art.

According to the present invention the method for the production of goods and articles of polyethylene character bonded to material not of polyethylene character comprises bringing a fluid layer, comprising a resinous polymeric aromatic phosphoric ester of the kind characterised by containing a recurrent grouping wherein a pentavalent phosphorus atom is bound to a terminal oxygen atom, to a terminal oxyaryl group and to each of two similar phosphorus atoms through an oxygen atom of the radicle of an aromatic compound having two nuclear hydroxyl groups attached to non-adjacent carbon atoms, into contact with a surface of polyethylene character, and subsequently effecting solidification of the fluid layer in contact with said surface.

In the case where it is required to produce a coating on an article of polyethylene character, the surface of the article may be coated with the molten resinous polymeric aromatic phosphoric ester. The body of polyethylene in this case is preferably heated to a temperature at least approaching that at which the resinous ester becomes fluid, and it will be understood that the resinous polymeric aromatic phosphoric ester employed must have a lower melting temperature than the polyethylene.

Alternatively the surface of the article is treated with a solution of the resinous polymeric aromatic phosphoric ester in a volatile solvent, and in this case it is possible to use such an ester having a melting temperature higher than that of the polyethylene. The coating is rendered solid by cooling it or by evaporating off the solvent.

Further coatings containing film-forming ingredients other than the resinous polymeric aromatic phosphoric esters may if desired be applied thereafter in known manner for instance coating compositions based on nitrocellulose, on drying oils, or synthetic or natural resins of various types or metal coatings or the like may be applied by spraying. These adhere to the coating of the resinous polymeric aromatic phosphoric ester and as the latter adheres well to the article or material of polyethylene character, the resulting composite coating adheres satisfactorily.

When it is required to bond an article of polyethylene character to a previously formed body of some material other than the resinous polymeric aromatic phosphoric ester but capable of adherence to the latter, for instance, glass, paper, metal, rubber, wood or textile, the bonding layer of the resinous polymeric aromatic phosphoric ester is brought into contact with both of the surfaces while it is in fluid condition. In the case of bodies of impermeable material such as glass, metal or the like, it will usually be desirable to employ the resinous polymeric aromatic phosphoric ester in molten form, so that solidification can be effected by subsequent cooling. When the material to be bonded to the polyethylene article is porous, as for instance cloth, the resinous polymeric aromatic phosphoric ester may be employed in solution in a volatile solvent, since the solvent can be caused to evaporate through the porous material. Even in the case of non-porous materials such as glass, metal or the like, it is often advisable in applying the resinous polymeric aromatic phosphoric ester first to apply it in the form of a solution in a volatile solvent and then to evaporate off the solvent completely before melting the layer deposited from the solution and forming the bond. When it is required to apply a coating of polyethylene to a body of rigid material the body of rigid material coated with the molten resinous polymeric aromatic phosphoric ester may have the required thickness of preheated polyethylene sheet applied to it with the aid of pressure, or it may be sprayed with molten polyethylene. On cooling to room temperature the union of the surfaces is found to be completed.

If desired the coating or bonding layer consisting substantially of resinous polymeric aromatic phosphoric ester may include other film-forming ingredients capable of existing in solid solution with said resinous polymeric aromatic phosphoric ester, for example, polyvinyl acetate or nitrocellulose, but preferably this layer consists wholly of one or more of the said resinous polymeric aromatic phosphoric esters.

The resinous aromatic phosphoric ester used according to the present invention may be for instance one derived by condensation between phenoxy-, para-chloro phenoxy-, ortho-chloro phenoxy-, 2:4 dibromo-phenoxy-, ortho-cresoxy-, para-cresoxy-, beta-naphthoxy-, alpha-naphthoxy-, para-phenyl phenoxy-, ortho-phenyl phenoxy-, or tertiary para-octyl phenoxy-phosphoryl dichlorides, or mixtures of two or more of these, and hydroquinone, resorcinol, 4:4'-dihydroxy diphenyl or a chlorine substitute 4:4'-dihydroxy diphenyl. These resins when heated become fluid at temperatures from 60 to 180° C. depending on the components used for the condensation. If it is desired to apply them by means of the volatile solvent technique, solvents such as ethylene dichloride, mixtures of benzene and alcohol or mixtures of toluene and alcohol are especially useful and the solution may be applied to the surfaces to be treated with it by spraying, brushing or dipping. As will be understood, if the resinous polymeric aromatic phosphoric ester is to be used as a surface coating it will frequently be desirable to include pigments or other insoluble effect materials or dyestuffs for decorative purposes.

The invention is further illustrated by the following examples.

Example 1

30 grams of a resinous polymeric aromatic phosphoric ester having a softening temperature of 102° C. as determined by the ball and ring method prepared by heating equimolecular quantities of 2:4 dichloro-phenoxy phosphoryl dichloride and hydroquinone as described in British application No. 117/48 (now British Patent 644,468) are dissolved in 100 cc. of ethylene dichloride. 3 grams of the pigment Monolite Fast Scarlet are incorporated into the solution and the resulting enamel is applied with a brush to the surface of a polyethylene tube. The coating is allowed to dry at room temperature. After 20 mins. drying the surface is practically tack-free and the opaque red coating is hard and glossy and has excellent adherence to the polyethylene tube.

Example 2

25 grams of the colourless resinous polymeric aromatic phosphoric ester softening at a temperature of 110° C. prepared by the reaction at raised temperature between equimolecular quantities of ortho-phenyl-phenoxy-phosphoryl dichloride and hydroquinone as described in British application No. 14,444/49 (United States Serial Number 151,298) are dissolved in 100 cc. of a mixture of 10 parts toluene and 10 parts industrial alcohol by volume. The resulting clear lacquer is applied with a brush to the surface of an article made of polyethylene and the coated object is allowed to dry off at room temperature. The resulting transparent coating is hard and glossy and colourless. It adheres excellently to the polyethylene object.

Example 3

30 grams of the resin softening at 148° C. prepared by the reaction at raised temperature between equimolecular amounts of 2:4-dichloro-phenoxy-phosphoryl dichloride and 4:4'-dihydroxy-diphenyl are dissolved in 100 cc. of a mixture of 80 parts benzene and 20 parts industrial alcohol by volume. The resulting transparent solution is painted with a brush on to the internal surface of a vessel made from an alloy of lead and antimony and the resulting coating is allowed to dry off. The coated vessel is then heated to a temperature of 150° as a result of which the coating becomes fluid. Molten polyethylene is then applied to the coated surface by means of an electrically heated spray gun and the vessel is allowed to cool until the coatings have become solid. The polyethylene coating is found to be strongly bonded to the internal wall of the vessel by the intervening layer of the resinous polymeric aromatic phosphoric ester.

Example 4

A quantity of the resinous polymeric aromatic phosphoric ester used in Example 1 is finely ground and is spread in a layer on to a steel plate and then covered with a sheet of polyethylene 2 mm. thick and the resulting sandwich is heated for 10 minutes at a temperature of 110–115° C. while being subjected to slight pressure, so that the resinous polymeric aromatic phosphoric ester melts but the polyethylene sheet does not melt. After cooling the resulting composite sheet to room temperature it is found that the polyethylene sheet is firmly bonded to the steel plate.

Example 5

A quantity of the unpigmented solution of the resinous polymeric aromatic phosphoric ester used in Example 1 in the same volatile solvent is brushed on to an object made of polyethylene and is allowed to dry off at room temperature. To the so-coated surface there is then applied by means of a spray gun a pigmented nitrocellulose lacquer, the coating of which is then dried off in known manner. The pigmented nitrocellulose coating is found to be firmly bonded to the polyethylene object. When the same nitrocellulose lacquer is sprayed directly on to the polyethylene object, it peels off immediately after it dries.

Example 6

28 grams of the resinous polymeric aromatic phosphoric ester used in Example 1 and 12 grams polyvinyl acetate are dissolved in 100 cc. of a mixture containing 50% butyl acetate, 10% butyl alcohol, 20% industrial alcohol and 20% toluene. The resulting clear solution is applied by means of a brush on to one surface each of two sheets of polyethylene and the solvent is dried off at room temperature. The sheets are then heated to a temperature of 105° C. and the two coated surfaces are compressed together at this temperature. On cooling to room temperature it is found that the two sheets of polyethylene are firmly bonded together.

Example 7

75 parts by weight of the purified resinous polymeric aromatic phosphoric ester used in Example 1 and 25 parts by weight of polyvinyl acetate are malaxated together in a steam heated vessel until a clear homogeneous fluid is obtained. After cooling to room temperature the hardened mixture is disintegrated to form a powder a quantity of which is evenly spread over the polyethylene sheet and a cotton fabric is applied so as to cover the powdery coating. The assembly is heated to 105 to 110° C. under slight pressure. On cooling it is found that the cotton fabric is firmly bonded to the surface of the polyethylene sheet.

I claim:

1. A laminated article comprising a polyethylene object, at least one surface of which is firmly bonded to a second surface with a layer of a resinous polymeric aromatic phosphoric ester containing a recurrent grouping wherein a pentavalent phosphorus atom is bound to a terminal oxygen atom, to a terminal oxyaryl group, and to each of two similar phosphorus atoms through the oxygen atoms of the radical of an aromatic compound having two nuclear oxygen atoms attached to non-adjacent carbon atoms of said aromatic compound.

2. An article as defined in claim 1 wherein the resinous polymeric ester is formed from the condensation of 2:4-dichloro-phenoxy phosphoryl dichloride and hydroquinone.

3. An article as defined in claim 1 wherein the resinous polymeric ester is formed from the condensation of ortho-phenyl-phenoxy-phosphoryl dichloride and hydroquinone.

4. An article as defined in claim 1 wherein the resinous polymeric ester is formed from the condensation of 2:4 dichloro-phenoxy-phosphoryl dichloride and 4:4-dihydroxy-diphenyl.

5. An article as defined in claim 1 wherein said second surface is a surface of a nitrocellulose lacquer.

6. An article as defined in claim 1 wherein said second surface is a surface of a fabric.

7. A method for firmly bonding a surface to a surface of a polyethylene object which comprises interposing a fluid layer comprising a resinous polymeric aromatic phosphoric ester containing a recurrent grouping wherein a pentavalent phosphorus atom is bound to a terminal oxygen atom, to a terminal oxyaryl group, and to each of two similar phosphorus atoms through the oxygen atoms of the radical of an aromatic compound having two nuclear oxygen atoms attached to non-adjacent carbon atoms of said aromatic compound between said surfaces and solidifying said fluid layer while said surfaces are maintained closely adjacent to one another.

8. A method as claimed in claim 7 in which said fluid layer is a melt and solidification is effected by cooling said melt.

9. A method as claimed in claim 7 in which said resinous polymeric ester is first applied as a powder and subsequently heated to render it fluid.

10. A method as claimed in claim 7 wherein said fluid layer is a solution of said resin in a solvent and solidification is effected by volatilizing said solvent.

11. A method as defined in claim 7 wherein the resinous polymeric aromatic ester is formed from the condensation of 2:4 dichloro-phenoxy-phosphoryl dichloride and hydroquinone.

12. A method as defined in claim 7 wherein the resinous polymeric aromatic ester is formed from the condensation of ortho-phenyl-phenoxy-phosphoryl dichloride and hydroquinone.

13. A method as defined in claim 7 wherein the resinous polymeric aromatic ester is formed from the condensation of 2:4 dichloro-phenoxy-phosphoryl dichloride and 4:4' dihydroxy-diphenyl.

14. A method for firmly bonding a surface to a surface of a polyethylene sheet which comprises the steps of applying to a surface, a layer comprising a resinous polymeric aromatic phosphoric ester containing a recurrent grouping wherein a pentavalent phosphorus atom is bound to a terminal oxygen atom, to a terminal oxyaryl group, and to each of two similar phosphorus atoms through the oxygen atoms of the radical of an aromatic compound having two nuclear oxygen atoms attached to non-adjacent carbon atoms of said aromatic compound, covering said layer with a polyethylene sheet to form a sandwich, applying a temperature of 105° C. to 115° C. which is sufficient to melt the resinous layer, but insufficient to melt the polyethylene sheet, and slight pressure in order to maintain bonding relationship and cooling the sandwich.

15. A method according to claim 14 wherein said resinous ester is the condensation product of 2:4 dichloro-phenoxy phosphoryl dichloride and hydroquinone and is applied as a finely ground powder to a steel plate, a polyethylene sheet is placed upon said powdered resin, whereupon said sandwich is heated for 10 minutes between a temperature of 110–115° C. while being subjected to slight pressure.

References Cited in the file of this patent

UNITED STATES PATENTS

| Number | Name | Date |
|---|---|---|
| 2,058,394 | Arvin | Oct. 27, 1936 |
| 2,238,681 | Dorough | Apr. 15, 1941 |
| 2,272,668 | Honel | Feb. 10, 1942 |
| 2,340,452 | Child et al. | Feb. 1, 1944 |
| 2,435,252 | Toy | Feb. 3, 1948 |
| 2,471,465 | Hasselt | May 31, 1949 |
| 2,543,229 | Chapman | Feb. 27, 1951 |
| 2,616,873 | Cass | Nov. 4, 1952 |
| 2,622,056 | De Coudres et al. | Dec. 16, 1952 |
| 2,636,876 | Zenftman et al. | Apr. 28, 1953 |

OTHER REFERENCES

"Modern Plastics," article published February 1948, vol. 25, No. 6, page 78.